Oct. 28, 1958 D. OPPENHEIM 2,858,144
SAFETY BELT FOR VEHICLES
Filed July 19, 1955 2 Sheets-Sheet 1
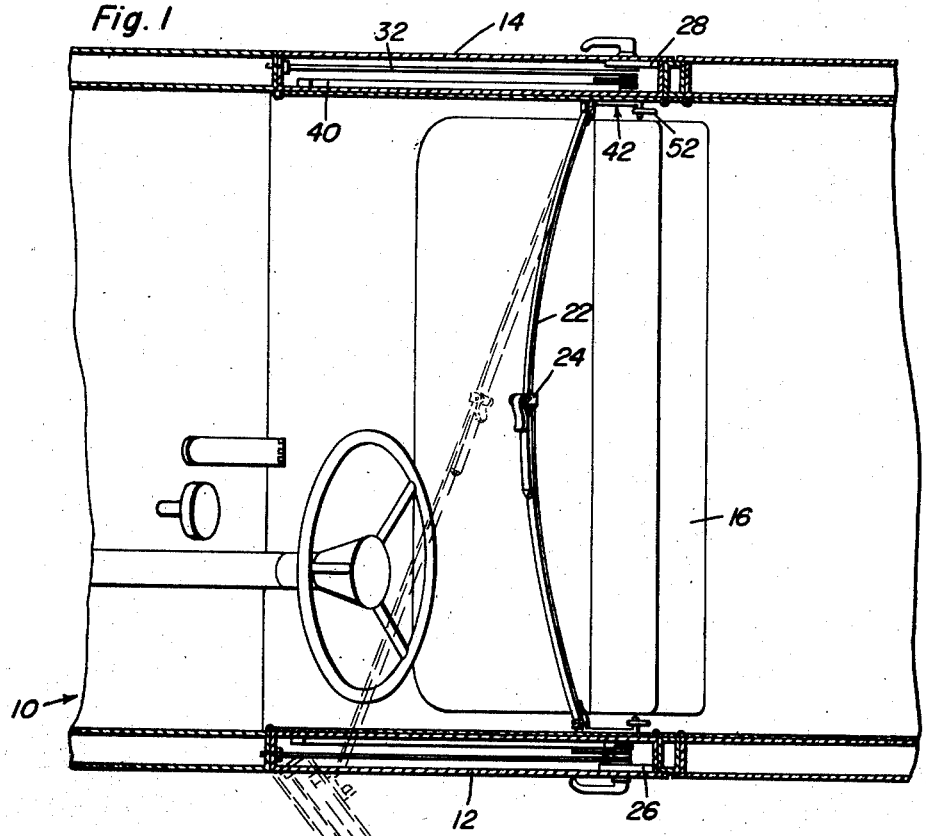
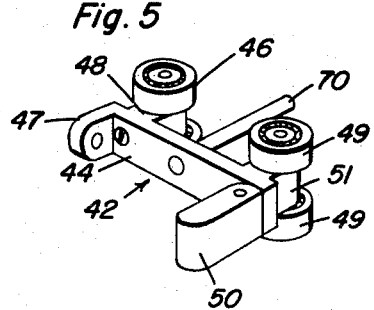
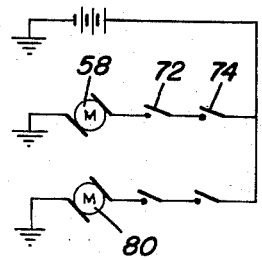
David Oppenheim
INVENTOR.

Oct. 28, 1958 D. OPPENHEIM 2,858,144
SAFETY BELT FOR VEHICLES
Filed July 19, 1955 2 Sheets-Sheet 2
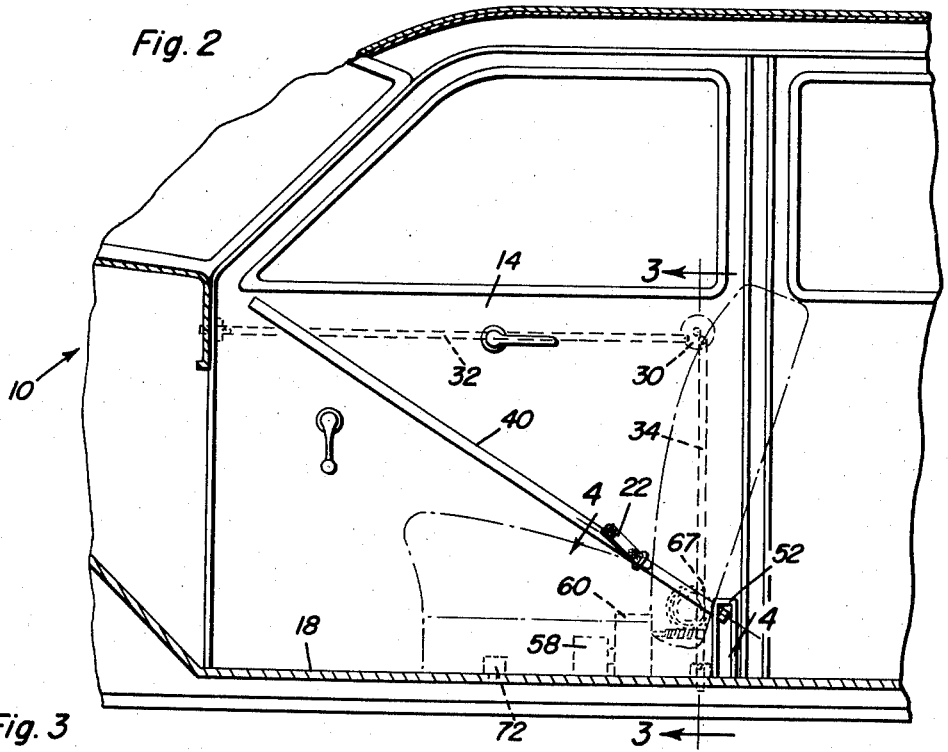
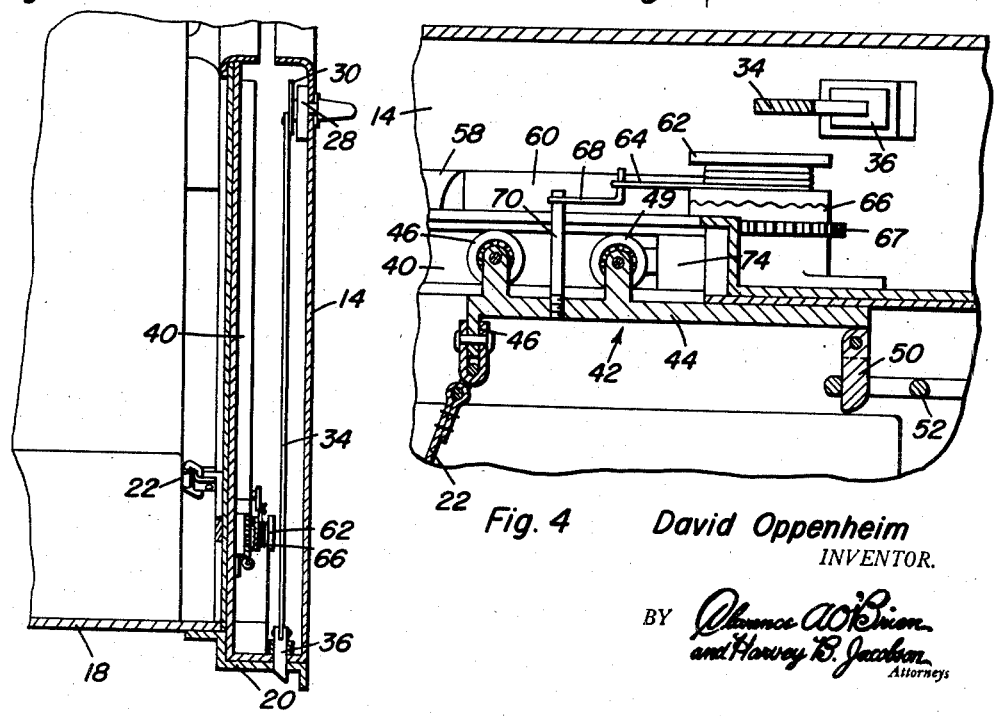
David Oppenheim
INVENTOR.

United States Patent Office 2,858,144
Patented Oct. 28, 1958

2,858,144

SAFETY BELT FOR VEHICLES

David Oppenheim, Forest Hills, N. Y.

Application July 19, 1955, Serial No. 523,007

14 Claims. (Cl. 280—150)

This invention relates to safety devices for vehicles, and particularly to a safety device which is passed in front of the occupants of the vehicle on either seat to prevent such occupants from being thrown forwardly out of the seat in the event of a sudden stop.

The purpose of the invention is to provide a safety belt structure which is moved to the operative protecting position in response to the closing of the vehicle doors, thereby making it unnecessary for the occupants of the vehicle to consciously strap themselves in the vehicle.

A more specific object of the invention is to provide a vehicle safety belt which is adapted to extend across the vehicle on the inside thereof and in juxtaposition to the vehicle seat, the belt having ends which are connected to carriages, the carriages being slidable in tracks on the two opposed vehicle doors and the tracks being inclined downwardly toward the rear of the vehicle so that when one of the doors is opened, the swinging movement thereof provides a component of force tending to push the carriage up the track and towards the hinged front end of the opening door, thereby separating the safety belt from the individual in the seat allowing him to depart from the vehicle, or allowing another person to enter the vehicle.

A further object of this invention is to assure that the doors of the vehicle will not open during impact, this being a common cause of aggravating injury in automotive collisions.

Another object of the invention is to provide locking means for the above described carriages, the locking means holding the carriages in a position which retains the belt in an operative position to protect individuals on the seat, said locking means being automatically releasable in response to opening one or both of the vehicle doors.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary horizontal sectional view of a part of a vehicle with the invention principles applied thereto;

Figure 2 is a longitudinal sectional view of the vehicle of Figure 1 showing the safety belt in the closed or operative position to hold vehicle occupants safely in case of accident;

Figure 3 is an enlarged sectional view taken substantially on the line 3—3 of Figure 2 and in the direction of the arrows;

Figure 4 is an enlarged sectional view taken substantially on the line 4—4 of Figure 2 and in the direction of the arrows;

Figure 5 is a perspective view of one of the carriages operable in the door mounted tracks; and Figure 6 is a schematic diagram indicating wiring for motors which assist movement of the carriages in one direction on their tracks.

The fragmentarily shown vehicle 10 indicates that the prime but not exclusive field of utility for the invention is the automobile. This vehicle has front doors 12 and 14 together with a seat 16, frame 18 and sill 20 for each door. The safety belt in the vehicle comprises a strap 22 which may be made of one piece or in parts connected together by a quick disconnect latch 24 near the center thereof. This latter construction is preferred inasmuch as the length of the strap 22 may be adjusted to suit the needs and desires of the occupants of the vehicle.

Each door has a door latch, latch 26 being in door 12 and latch 28 being in door 14. Handles of standard description are used to actuate the latches 26 and 28, and additional door latching means are provided in each door, said additional latching means being operable simultaneously with the standard latches 26 and 28. To accomplish this, a disk 30 is secured to a rotatable part of the door latch operating mechanism, and links 32 and 34 are pivoted to the disk 30. At the ends of the rods 32 and 34, there are keepers 36 adapted to pass into openings in the vehicle door jamb and in the door sill 20.

Each door is fitted with identical structure for supporting the ends of straps 22 in the operative position, that is, the position of support for the vehicle occupants at the time of vehicle impact or sudden stop. Door 14, for example, has a track 40 in it, the track being inclined downwardly from the front hinged end of the door 14 toward the rear edge thereof. A carriage 42 is held captive in rail or track 40 and is slidable from one end thereof to the opposite end. The specific construction of carriage 42 is seen best in Figures 4 and 5. It has a base plate 44 on which a front pair of wheels 46 is carried by a depending bracket 48, and a rear pair of wheels 49 which is carried by a depending bracket 51. The wheels 46 and 49 are rotated in track 40, and the depending brackets 48 and 51 are passed through the outwardly opening track so that the plate 44 is on the exterior of the track. An ear 47 projects from one surface of the plate 44 and has one end of strap 22 secured to it. A pivoted latch 50 is carried by the plate 44 and engageable with a generally U-shaped keeper 52 to hold the carriage 42 in a predetermined position at the lower rear end of the track 40. The keeper is secured to the frame of the vehicle so that when the carriage 44 is moved downwardly and rearwardly in track 40, the latch 50 engages the keeper 52 and the carriage cannot be returned until the keeper 52 becomes disengaged from the latch 50. Latch 50 is returned to its upright position by gravity, aided by the snap-back resulting from latch 50 striking the forward leg of keeper 52 when the carriage travels down the track 40 by the force of gravity.

As the door 14 is swung open, the carriage 42 will be moved upwardly of track 40 towards the hinged end of the door. When the same door is closed, gravity will tend to return the carriage 42 to the lowermost part of the track 40 which is near the opposite edge of the door. To aid in the return of the carriage 42 and to assure that the carriage is moved fast enough so as to engage latch 50 with keeper 52, a motor 58 is mounted in the vehicle and through a reduction gearing unit 60 actuates a winding drum 62 on which there is a cable 64. This winding drum is drivingly connected with the reduction gearing unit 60 by an overriding clutch 66. The cable 64 is attached to the carriage 42 by means of a bracket 68 which is connected to a pin 70, the pin being fixed to the plate 44.

The motor 58 for carriage 42 in door 14 is connected with a suitable source of electrical energy (Figure 6). Switches automatically control the actuation of the motor 58, there being one switch 72 mounted in the path of travel of the door 14, as at the door sill 20. A limit switch 74 is mounted in the path of travel of the carriage 42. Switches 72 and 74 are arranged such that when the vehicle doors are closed and the carriage 42 is in the latched position (Figure 4), the switch 72 is open. When the door is opened, the motion of the door 14 moves carriage 42 up the track 40. When the door is closed, switch 72 is closed, causing motor 58 to be actuated. The motor continues to operate until sufficient cable 64 is wound around drum 62 until the carriage opens switch 74. Then, the motor 58 is stopped. This leaves switch 74 open and switch 72 closed. Now, if the door is again opened, switch 74 automatically closes inasmuch as the carriage 44 is moved therefrom, but switch 72 is also opened. Again closing door 14 will close switch 72 and cause the motor 58 to be operative until such time that the carriage 42 actuates limit switch 74. This particular operation is common to both doors 12 and 14.

The operation of the invention is as follows: When the door, say, door 14, is opened, actuation of the standard door latch 28 simultaneously separates the additional latches from their openings in the vehicle structure. When the door is in the closed condition, these additional latches assure that the door will not come open in response to and as a result of collisions.

Swinging door 14 in an arc outwardly of the vehicle introduces a component of force on the carriage 42 which moves that carriage upwardly of track 40 toward the hinged front edge of the door. Inasmuch as the strap 22 is secured to the carriage 42, the strap will be moved forwardly in the vehicle, allowing the passenger to get out of the vehicle without having to even touch the safety belt. It is noted in Figure 4 that the latch 50 is connected to the carriage 42 and when the door 14 is opened, the latch 50 is separated from the keeper 52 by being swung outwardly.

When a person becomes seated in the vehicle, he closes the door 14 as he normally would in the absence of any safety device. Gravity lowers the carriage down the track 40 and to assist in the movement, the motor 58 rotates the drum through the gearing in gear box 60 as well as the clutch 66 that is actuated by the worm and gear 67. The arrangement of switches is such that when the carriage 42 is moved sufficiently far down the track 40 all the time drawing the strap 22 in a safety position in front of the occupant of the vehicle, the motor is de-energized. The latch 50 is so shaped that it is capable of limited pivotal movement, and when the limit is reached, it binds with the upper surface of the plate 44. This prevents the carriage from moving upwardly in the track 40 even if the vehicle should become very suddenly stopped, as by collision. To remove the safety belt from the vehicle occupants, it is necessary only that the door 12 or 14 in the illustration, be opened, causing the carriages appertinent to the doors to be displaced in their tracks, thereby separating the strap 22 from the vehicle occupants a sufficient amount to allow either ingress or egress from the vehicle. The return of the carriages is accomplished by gravity aided by motor 58 for the door 14 and motor 80 for the door 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A safety device for a vehicle of the type having doors hinged at their front edges on opposite sides of the vehicle, said device comprising a track on each door and sloped downwardly from the hinged edge of the door toward the opposite edge of the door, a carriage movably connected with each track and movable from the hinged edge to the opposite edge of the doors, and a belt having ends connected to said carriages so that when one door is opened its carriage moves in said track and said belt moves toward the hinged edge of said one door.

2. The safety device of claim 1 and means operable to lock said carriages in one position with respect to said tracks when the vehicle doors are closed.

3. A safety device for a vehicle of the type having doors that are hinged at the front edge of each on opposite sides of the vehicle, said safety device comprising a track on each door and sloped downwardly from the hinged edge of the door toward the opposite edge of the door, a carriage movably connected with each track and movable from the hinged edge to the opposite edge of the doors, a belt having ends connected to said carriages so that when one door is opened its carriage moves in said track and said belt moves toward the hinged edge of said one door, said tracks being downwardly inclined toward said opposite edges of the doors whereby a force component tends to slide said carriages upwardly in response to opening movement of said doors, and means for locking said carriages at the lower ends of said tracks to retain said belt in position to support individuals on the vehicle seat.

4. In a vehicle safety device for a vehicle that has doors each hinged at its front edge, a track on each door inclined downwardly toward the opposite edge of the door, a strap adapted to extend across the vehicle to support individuals on the vehicle seat, and means carried by both of said tracks and secured to said strap for holding said strap against the individuals on one seat of the vehicle when the doors are closed and for separating the strap from the individuals in response to opening movement of either door.

5. In a vehicle safety device for a vehicle that has doors each hinged at its front edge, a track on each door inclined downwardly toward the opposite edge of the door, a strap adapted to extend across the vehicle to support individuals on the vehicle seat, means carried by both of said tracks and secured to said strap for holding said strap against the individuals on one seat of the vehicle when the doors are closed and for separating the strap from the individuals in response to opening movement of either door, and locking means for retaining said strap holding means in a locked condition while the vehicle doors are closed.

6. The vehicle safety device of claim 5 wherein said tracks are hollow elongated bodies and said strap retaining means includes a carriage captive in each track.

7. The vehicle safety device of claim 5 wherein said strap retaining means includes a carriage carried by each track, and power actuated means for assisting in moving said carriages in said tracks.

8. A vehicle safety device for a vehicle which has a seat together with opposed doors hinged at the front edge thereof, said safety device comprising in each door a track which opens inwardly toward the center of the vehicle, a carriage disposed in said track, said track being inclined downwardly toward the edge opposite the hinged edge of the door, a locking device on said carriage and the vehicle for holding said carriage in a position adjacent to said opposite edge of a door, a safety strap secured at one end to said carriage and secured at the opposite end to the carriage in the opposite door so that when said carriages are in the locked positions, the strap is maintained in a supporting position in front of the occupants of the vehicle, and said carriages being movable toward the hinged edges of the door in response to opening movement of the door in order to separate the strap from the occupants of the vehicle to permit free ingress and egress from the vehicle.

9. In a vehicle safety device for a vehicle that has doors hinged at the front edges thereof, a strap, a track in each door and angularly inclined downwardly and rearwardly of the door, a carriage disposed in each track, a strap secured to each carriage and extending across the vehicle, said carriage of each door being slidable in its track in response to opening and closing movement of the doors, and means operatively connected with each carriage and operative in response to opening and closing movement of said doors for locking and releasing said carriages in a predetermined position in said tracks.

10. In a vehicle safety device for a vehicle that has doors hinged at the front edges thereof, a strap, a track in each door and angularly inclined downwardly and rearwardly of the door, a carriage disposed in each track, a strap secured to each carriage and extending across the vehicle, said carriage of each door being slidable in its track in response to opening and closing movement of the doors, means operatively connected with each carriage and operative in response to opening and closing movement of said doors for locking and releasing said carriages in a predetermined position in said tracks, and power operated means connected with said carriages to assist said carriages in their movement within said tracks.

11. In a safety device for a vehicle that has a door hinged at its front edge and a seat, a track connected to said door and sloped downwardly from the hinged edge toward the opposite edge, a belt adapted to extend across the seat in a position to provide protection for the motorist in case of a high deceleration of the vehicle, and means connected with said belt and carried by said track for movement therein in response to hinged motion of the door.

12. In a safety device for a vehicle that has a door hinged at its front edge and a seat, a track connected to said door and sloped downwardly from the hinged edge toward the opposite edge, a belt adapted to extend across the seat in a position to provide protection for the motorist in case of a high deceleration of the vehicle, means connected with said belt and carried by said track for movement therein in response to hinged motion of the door, and a locking device operatively connected with said means to releasably hold said means and belt in a position where the belt extends across the front of an occupant of the seat of the vehicle.

13. A safety device for a vehicle that has doors which are hinged at its front edge of each on opposite sides of the vehicle, said safety device comprising a track on each door which is sloped downwardly from the hinged edge of the door toward the opposite edge of the door, a carriage provided with rollers, each track being hollow and the rollers of said carriage captive in the hollow track enabling the carriage to move readily from the hinged edge of the door to the opposite edge of the door and back, a belt having ends connected to said carriages so that when one door is opened its carriage moves in its track toward the hinged edge of said one door and said belt moves correspondingly with it, said tracks downwardly inclined toward said opposite edges of said doors so that a force component tends to slide said carriages upwardly in response to opening movement of said doors and the force of gravity causes said carriages to move downwardly in response to closing movement of said doors.

14. The safety device of claim 13 wherein there are means for locking said carriages at the lower ends of said tracks to retain said belt in position to support individuals on the vehicle seat when both of said doors are in the closed position.

References Cited in the file of this patent

UNITED STATES PATENTS

| 1,775,256 | Rowe | Sept. 9, 1930 |
| 2,108,303 | Beddow | Feb. 15, 1938 |

FOREIGN PATENTS

| 1,068,580 | France | Feb. 3, 1954 |